UNITED STATES PATENT OFFICE.

WILLIAM HENRY PERKIN, OF OXFORD, AND SAMUEL BRADBURY, OF ASHTON-UPON-MERSEY, ENGLAND.

TREATMENT OF COTTON AND COTTON GOODS AND OTHER COMBUSTIBLE SUBSTANCES TO RENDER THEM PERMANENTLY LESS INFLAMMABLE.

1,224,204.                    Specification of Letters Patent.        Patented May 1, 1917.

No Drawing.          Application filed July 31, 1914.   Serial No. 854,354.

*To all whom it may concern:*

Be it known that we, WILLIAM HENRY PERKIN, Ph. D., F. R. S., a resident of Oxford, in the county of Oxford, England, and SAMUEL BRADBURY, F. C. S., a resident of Ashton-upon-Mersey, in the county of Chester, England, both subjects of the King of Great Britain and Ireland, have invented certain new and useful improvements in the treatment of cotton and cotton goods and other combustible substances to render them permanently less inflammable, of which the following is a specification.

This invention relates to a process of rendering cotton fibers and goods and other suitable permeable combustible substances permanently less inflammable. It consists in first treating such substances with a solution of an alkali metal salt containing a metal in its acid radical aluminate, such as an alkali metal, then drying them sufficiently to deposit the metal as the aluminate therein, and afterward subjecting them in the presence of moisture to the action of an atmosphere largely composed of carbonic acid gas. Its object is to materially reduce the cost of the chemical agents previously employed and to effect a material decrease in the labor required.

The following is an example of how this invention may be carried into effect for the purpose of rendering flannelet permanently less inflammable even after repeated washings with soap.

The flannelet is first impregnated with a solution of sodium aluminate at 30° Tw. and is then squeezed and dried. It is then passed through an aging or other suitable machine into which steam and carbonic acid gas are allowed to enter as required. A wide range in the proportions of $CO_2$ present in the atmosphere may be employed according to the material treated and the method of treating it. We find that good practical results may be obtained with proportions varying from 10% to an atmosphere practically composed of $CO_2$. After the treatment with the gas is finished the material is washed and again dried.

We do not, however, limit ourselves to the procedure indicated in the above example. The liquid or gas may be forced or drawn in any known or suitable way through the substances to be treated if necessary or advisable, especially in the case of raw cotton, wood, closely woven fabrics and other bodies not easily permeable by liquids or gases. The strength of the solution employed may also be altered according to the material treated and the amount of fireproofing required.

In the example steam is referred to as being employed for the purpose of producing the proper moist conditions to enable the gas to readily act upon and fix the aluminate. If preferred, however, the material to be treated by the gas may obtain the requisite moisture by absorption from the air or by being placed in or passed through a suitable moist atmosphere or by being exposed to a fine spray. Spraying may be performed concurrently with the gas treatment.

The time required to fix the aluminate may be reduced by increasing the temperature at which reaction with the $CO_2$ takes place. Thus even when steam is employed the $CO_2$ may be separately heated. Or the desired temperature may be attained by the heat set up as a result of and during the chemical changes which take place under certain conditions, as in the case of a comparatively large mass of substance being treated with $CO_2$.

To obtain the best commercial results it is essential not only that the aluminate must first be dried and deposited in the substance but that the moisture present during the treatment with $CO_2$ must not be in such quantity as to disturb the condition established in the substance by the drying of the aluminate.

The carbonic acid gas may be produced in any known or suitable manner.

What we claim is:—

1. The process of rendering cotton goods and other suitable permeable substances permanently less inflammable, which comprises treating said permeable substances with a solution of an alkali metal salt containing a metal in its acid radical, and subsequently drying the substances thus treated, then treating the dried substances with carbonic acid gas in the presence of moisture, the moisture present being in such quantities as not to disturb the conditions established in the substances by the previous drying, and finally washing the thus treated substances to remove the soluble carbonates and again drying the substances.

2. The process of rendering cotton goods and other suitable permeable substances permanently less inflammable, which comprises treating said permeable substances with a solution of an alkali metal aluminate and subsequently drying the material thus treated, then treating the dried substances with carbonic acid gas in the presence of moisture, the moisture present being in such quantities as not to disturb the conditions established in the substances by the previous drying, and finally washing the thus treated substances to remove the soluble carbonates, and again drying the substances.

3. The process of rendering cotton goods and other suitable permeable substances permanently less inflammable, which comprises treating said permeable substances with a solution of an alkali metal salt containing a metal in its acid radical, and subsequently drying the substances thus treated, then treating the dried substances with carbonic acid gas under pressure in the presence of moisture, the moisture present being in such quantities as not to disturb the conditions established in the substances by the previous drying, and finally washing the thus treated substances to remove the soluble carbonates, and again drying.

4. The process of rendering cotton goods and other suitable permeable substances permanently less inflammable, which comprises treating said permeable substances with a solution of an alkali metal aluminate, and subsequently drying the substances thus treated, then treating the dried substances with carbonic acid gas under pressure in the presence of moisture, the moisture present being in such quantities as not to disturb the conditions established in the substances by the previous drying, and finally washing the thus treated substances to remove the soluble carbonates, and again drying.

In witness whereof we have hereunto set our hands in the presence of two subscribing witnesses.

WILLIAM HENRY PERKIN.

Witnesses:
   CECIL ANTHONY HOBAN,
   ALBERT EDWARD HOLTON.

SAMUEL BRADBURY.

Witnesses:
   JOHN O'CONNELL,
   FRANK A. HEYS.